US012619685B2

(12) United States Patent
Kim et al.

(10) Patent No.: US 12,619,685 B2
(45) Date of Patent: May 5, 2026

(54) APPARATUS FOR CLASSIFYING DATA AND METHOD THEREOF

(71) Applicant: AiM Future Inc., Seoul (KR)

(72) Inventors: Yihwan Kim, Seoul (KR); Hoseok Chang, Seoul (KR); Namsoon Jung, Folsom, CA (US)

(73) Assignee: AiM Future Inc., Seoul (KR)

( * ) Notice: Subject to any disclaimer, the term of this patent is extended or adjusted under 35 U.S.C. 154(b) by 707 days.

(21) Appl. No.: 18/179,132

(22) Filed: Mar. 6, 2023

(65) Prior Publication Data

US 2023/0315813 A1     Oct. 5, 2023

Related U.S. Application Data

(60) Provisional application No. 63/326,133, filed on Mar. 31, 2022.

(51) Int. Cl.
*G06N 3/09*      (2023.01)
*G06F 18/24*     (2023.01)
*G06N 3/092*     (2023.01)

(52) U.S. Cl.
CPC ....... *G06F 18/24765* (2023.01); *G06N 3/092* (2023.01)

(58) Field of Classification Search
CPC ........ G06N 3/092; G06N 3/048; G06N 3/063; G06N 3/09; G06N 3/0464; G06F 18/24765; G06F 18/2433; G06V 10/764; G06V 10/809; G06V 10/82; G06V 10/955
See application file for complete search history.

(56) References Cited

U.S. PATENT DOCUMENTS

2008/0232682 A1*   9/2008   Eswaran ............. G06F 18/2135
                                                            382/224
2016/0063396 A1*   3/2016   Cheng .................... G06N 20/20
                                                            706/12
2017/0069327 A1    3/2017   Heigold et al.
2021/0365774 A1    11/2021  Muhammad
2021/0383224 A1    12/2021  Chen et al.
(Continued)

FOREIGN PATENT DOCUMENTS

KR        102022776 B1      9/2019
KR        102026396 B1      9/2019
(Continued)

OTHER PUBLICATIONS

Li et al., "CutPaste: Self-Supervised Learning for Anomaly Detection and Localization," 2021 IEEE/CVF Conference on Computer Vision and Pattern Recognition (CVPR), Nashville, TN, USA, Jun. 20-25, 2021, pp. 9664-9674. (11 pages).

*Primary Examiner* — Dave Misir
(74) *Attorney, Agent, or Firm* — SEED INTELLECTUAL PROPERTY LAW GROUP LLP

(57) ABSTRACT

Provided is a method for classifying data in an electronic apparatus, including obtaining target data, obtaining first classification information by using a classifier set including a plurality of classifiers based on the target data, obtaining second classification information by using a neural network model based on the target data, comparing the first classification information and the second classification information, and verifying the classifier set based on a result of comparing the first classification information and the second classification information.

20 Claims, 11 Drawing Sheets

(56)          References Cited

U.S. PATENT DOCUMENTS

| | | |
|---|---|---|
| 2022/0004858 A1 | 1/2022 | Lee et al. |
| 2022/0335281 A1 | 10/2022 | Spieker et al. |
| 2024/0233353 A1* | 7/2024 | Daultani ............. G06V 10/454 |

FOREIGN PATENT DOCUMENTS

| | | | |
|---|---|---|---|
| KR | 10-2020-0011028 | A | 1/2020 |
| KR | 102094377 | B1 | 3/2020 |
| KR | 10-2020-0111948 | A | 10/2020 |
| KR | 10-2021-0152402 | A | 12/2021 |
| KR | 10-2022-0002046 | A | 1/2022 |
| KR | 10-2022-0010419 | A | 1/2022 |
| KR | 102407730 | B1 | 6/2022 |
| KR | 10-2022-0144339 | A | 10/2022 |
| KR | 102573671 | B1 | 9/2023 |

* cited by examiner

APPARATUS FOR CLASSIFYING DATA AND METHOD THEREOF

CROSS-REFERENCE TO RELATED APPLICATION(S)

This application claims the benefit of U.S. Provisional Patent Application No. 63/326,133, filed on Mar. 31, 2022, in the United States Patent and Trademark Office, the disclosure of which is incorporated herein by reference.

BACKGROUND

Technical Field

Example embodiments relate to a method for obtaining first classification information using a classifier set including a plurality of classifiers, obtaining second classification information using a neural network model, and verifying the classifier set by comparing the first classification information and the second classification information, and relate to an apparatus thereof. Further, example embodiments relate to a method of obtaining first classification information using a classifier set, determining a classification value of target data based on the first classification information when the first classification information satisfies a configured condition, and if the first classification information does not satisfy the configured condition, obtaining second classification information using a neural network model to determine a classification value of the target data.

Description of the Related Art

The process of image recognition is frequently attempted in the fields of AI. It is also one of the most important applications in the relevant industry. Recognizing people or objects in the input images and utilizing the result of the recognition are useful in many of the practical applications in edge devices, such as the image recognition and processing through a smartphone.

This kind of application is becoming more feasible because the performance of the built-in application processor(s) and camera(s) in smartphones has greatly improved in recent years. A neural processing unit (NPU) or AI accelerator can be used along with the powerful central processing unit (CPU) in these type of edge devices in order to provide more efficient AI functionalities, such as inferencing for the image recognition. In such cases, an optimization of the NPU is still important in the edge devices. It is because there is a limit to raising the performance of hardware itself for increasing the inference speed in an efficient manner.

Further, a method for data classification using a neural network model may show high classification accuracy when sufficiently learned, but there are disadvantages such as requiring a large amount of computation and requiring secured sufficient training data. Therefore, if sufficient computing power is not secured, it is impossible to proceed with data classification using a neural network model, or even if it is possible to proceed with data classification using a neural network model, it may not be effective in terms of cost, such as taking an excessively long time for classification.

With regard thereto, prior arts KR102407730B1 and US20210365774A1 may be referred to.

BRIEF SUMMARY

One or more embodiments of the present disclosure relates to an approach for detecting abnormal objects utilizing a NPU, and a novel approach for a hierarchical and optimized architecture of the multiple neural networks for the abnormal object detection.

An aspect provides a method for classifying data in an electronic apparatus, including obtaining target data, obtaining first classification information by using a classifier set including a plurality of classifiers based on the target data, obtaining second classification information by using a neural network model based on the target data, comparing the first classification information and the second classification information, and verifying the classifier set based on a result of comparing the first classification information and the second classification information, and provides an electronic apparatus thereof.

Another aspect also provides a method for classifying data in an electronic apparatus, including obtaining target data, obtaining first classification information by using a classifier set including a plurality of classifiers based on the target data, if the first classification information satisfies a configured condition, determining a classification value of the target data based on the first classification information, and if the first classification information does not satisfy the configured condition, obtaining second classification information by using a neural network model based on the target data and determining a classification value of the target data based on the second classification information.

The technical tasks to be achieved by the present example embodiments are not limited to the technical tasks described above, and other technical tasks may be inferred from the following example embodiments.

According to an aspect, there is provided a method for classifying data in an electronic apparatus, including obtaining target data, obtaining first classification information by using a classifier set including a plurality of classifiers based on the target data, obtaining second classification information by using a neural network model based on the target data, comparing the first classification information and the second classification information, and verifying the classifier set based on a result of comparing the first classification information and the second classification information.

According to an example embodiment, the method may further include, based on the result of comparing the first classification information and the second classification information, determining an operating method of the classifier set, wherein the operating method of the classifier set includes an operation sequence of the plurality of classifiers.

According to an example embodiment, the electronic apparatus may determine an operating method of the classifier set further based on information of time required for the classifier set to generate the first classification information.

According to an example embodiment, the determining the operating method of the classifier set may include, based on the result of comparing the first classification information and the second classification information, determining reliability of the first classification information, determining whether the reliability exceeds a configured threshold value, and if the reliability is less than the configured threshold value, changing the operating method of the classifier set.

According to an example embodiment, the obtaining the first classification information may include using a first classifier included in the plurality of classifiers based on the target data, if output information of the first classifier satisfies a configured condition, determining the output information of the first classifier as the first classification information, and if the output information of the first classifier does not satisfy the configured condition, if a second classifier configured to operate in an order following the first classifier is present among the plurality of classifiers, using the second classifier based on the target data, and if the second classifier is not present, obtaining information indicating that the configured condition is not satisfied.

According to an example embodiment, the first classification information and the second classification information may include at least one of information on whether the target data is abnormal data, and if the target data is abnormal, information on a reason for an abnormality.

According to an example embodiment, at least one of the first classification information and the second classification information may include a plurality of candidate classification values.

According to an example embodiment, if the second classification information includes a plurality of candidate classification values, the comparing the first classification information and the second classification information may include determining one or more candidate classification values that satisfy a configured criterion among the plurality of candidate classification values included in the second classification information, and identifying whether each of the one or more candidate classification values matches a classification value indicated by the first classification information, wherein the configured criterion is a criterion related to probabilities that data belongs to each of the plurality of candidate classification values.

According to an example embodiment, the method may further include accessing a processor for neural processing, and the processor for neural processing may process at least some of an operation for obtaining the first classification information, an operation for obtaining the second classification information and an operation for comparing the first classification information and the second classification information.

According to an example embodiment, if the processor for neural processing processes the operation for obtaining the first classification information, the method may further include obtaining information on an amount of computation required for the operation of each of the plurality of classifiers, and based the information on the amount of computation, determining a core, among a plurality of cores, to assign the operation for each of the plurality of classifiers.

According to an example embodiment, the method may further include determining computing power for each of the plurality of cores related to the processor for neural processing, wherein the electronic apparatus determines a core, among the plurality of cores, to assign the operation for each of the plurality of classifiers based on the computing power of each of the plurality of cores.

According to an example embodiment, the first classifier included in the plurality of classifiers may determine whether data has a first classification value, the second classifier included in the plurality of classifiers may determine whether data has a second classification value, and the first classification value and the second classification value may be different from each other.

According to an example embodiment, the obtaining the target data may include obtaining original data and generating the target data by processing the original data.

According to an example embodiment, the neural network model may include one or more among one or more convolution layers, one or more pooling layers and one or more dense layers.

According to an aspect, there is provided a method for classifying data in an electronic apparatus, including obtaining target data, obtaining first classification information by using a classifier set including a plurality of classifiers based on the target data, if the first classification information satisfies a configured condition, determining a classification value of the target data based on the first classification information, and if the first classification information does not satisfy the configured condition, obtaining second classification information by using a neural network model based on the target data and determining a classification value of the target data based on the second classification information.

According to an aspect, there is provided an electronic apparatus for classifying data, including a memory for storing instructions and a processor, wherein the processor, being connected to the memory, is configured to obtain target data, obtain first classification information by using a classifier set including a plurality of classifiers based on the target data, obtain second classification information by using a neural network model based on the target data, compare the first classification information and the second classification information, and verify the classifier set based on a result of comparing the first classification information and the second classification information.

Additional aspects of example embodiments will be set forth in part in the description which follows and, in part, will be apparent from the description, or may be learned by practice of the disclosure.

According to example embodiments, through an electronic apparatus and a method for processing information, it is possible to secure high classification accuracy while saving costs such as computation amount and time for data classification.

Further, according to example embodiments, it is possible to perform data classification more efficiently by using a processor for neural processing.

Additional features and advantages of the disclosure will be set forth in the description which follows, and in part will be apparent from the description, or may be learned by practice of the disclosure. The objectives and other advantages of the disclosure will be realized and attained by the structure particularly pointed out in the written description and claims hereof as well as the appended drawings.

BRIEF DESCRIPTION OF THE SEVERAL VIEWS OF THE DRAWINGS

These and/or other aspects, features, and advantages of the disclosure will become apparent and more readily appreciated from the following description of example embodiments, taken in conjunction with the accompanying drawings of which.

5

6

Figure 7:
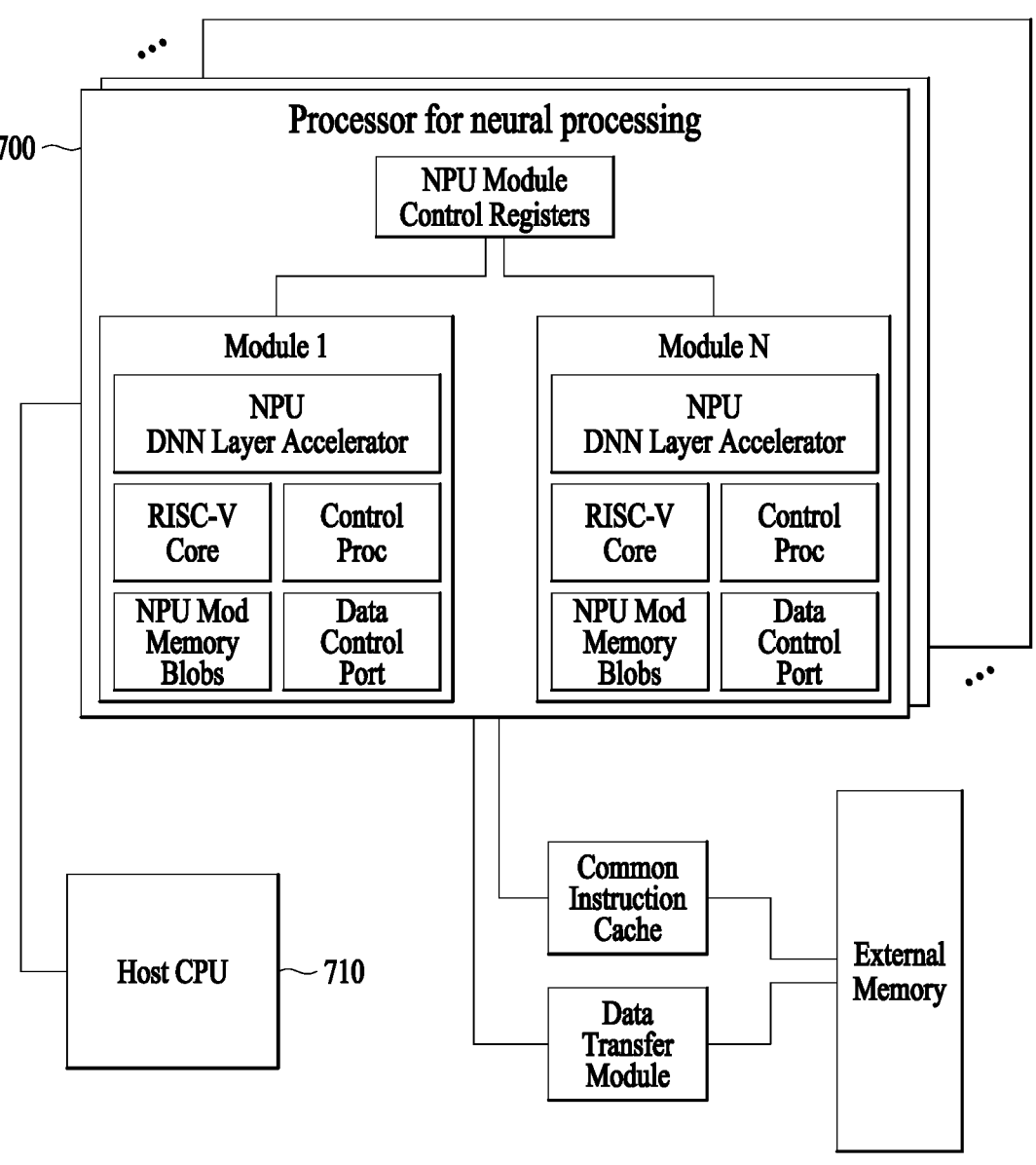
Figure 8:
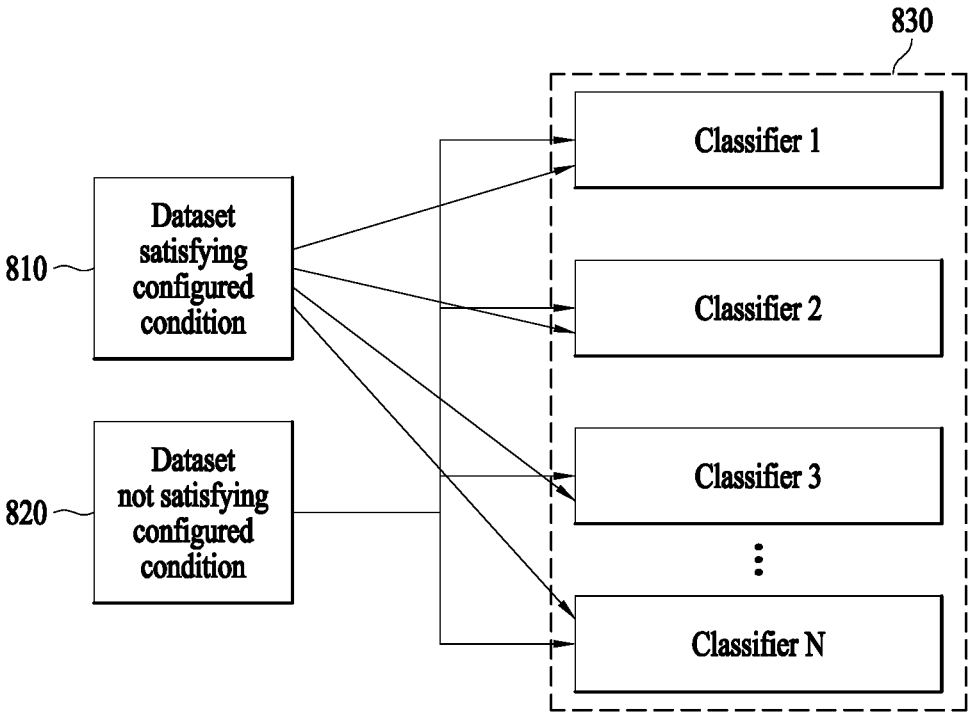
Figure 9:
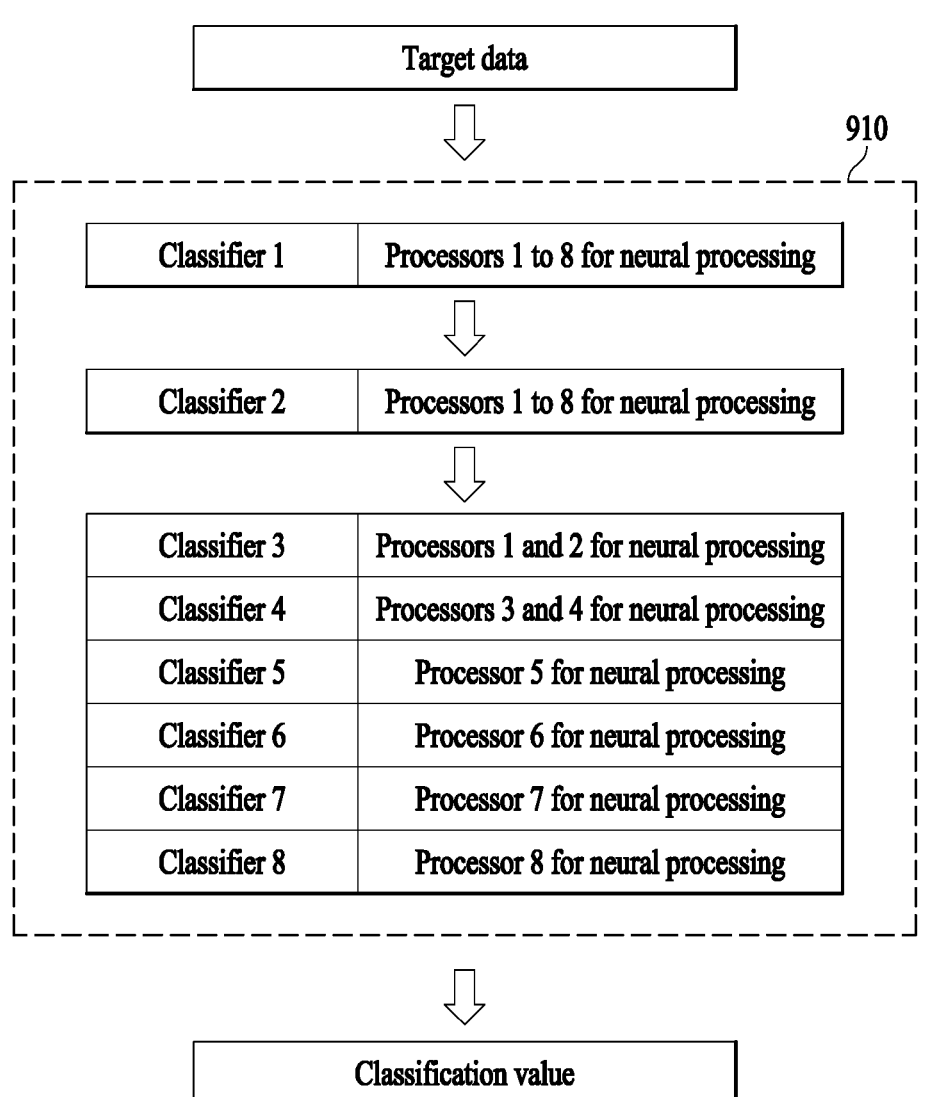
Figure 10:
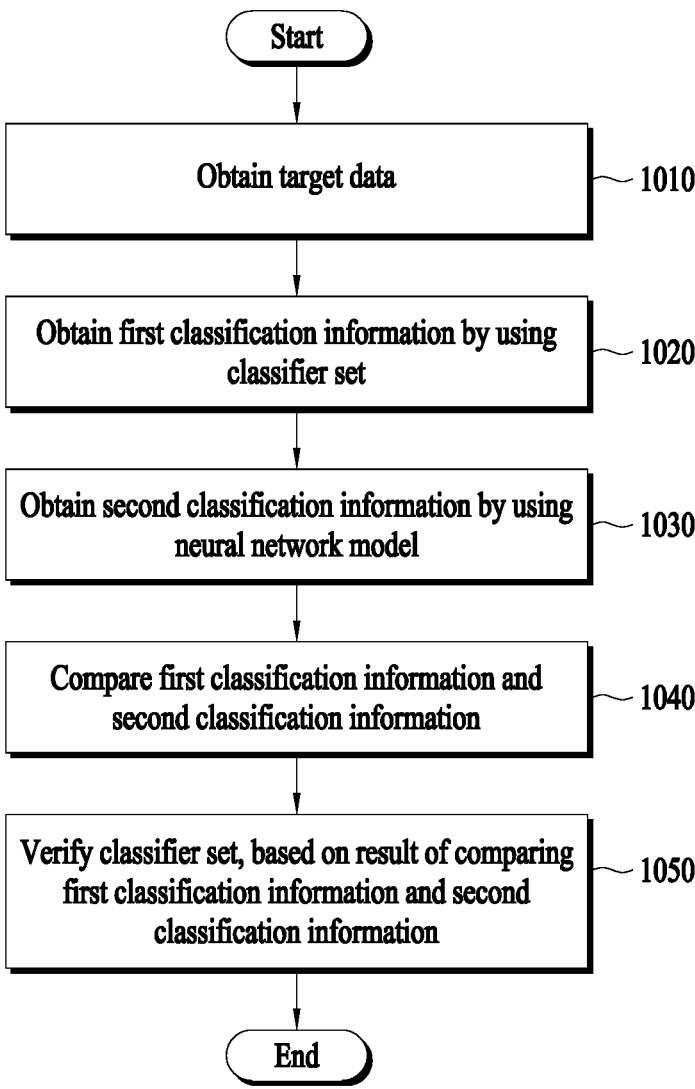
Figure 11:
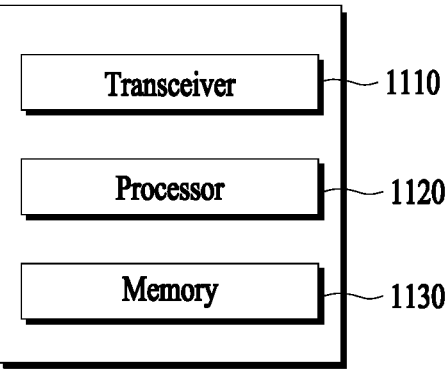

FIG. 7 is a diagram for illustratively explaining a method of classifying data using one or more processors for neural processing according to an example embodiment;

FIG. 8 is a diagram for illustratively explaining a method of designing a classifier set according to an example embodiment;

FIG. 9 is a diagram for illustratively explaining an operation scheduling method related to how to process an operation of each classifier according to an example embodiment;

FIG. 10 is an operation flowchart of a data classification method of an electronic apparatus according to an example embodiment; and FIG. 11 is an example diagram of a configuration of an electronic apparatus for classifying data according to an example embodiment.

DETAILED DESCRIPTION

Terms used in the example embodiments are selected from currently widely used general terms when possible while considering the functions in the present disclosure. However, the terms may vary depending on the intention or precedent of a person skilled in the art, the emergence of new technology, and the like. Further, in certain cases, there are also terms arbitrarily selected by the applicant, and in the cases, the meaning will be described in detail in the corresponding descriptions. Therefore, the terms used in the present disclosure should be defined based on the meaning of the terms and the contents of the present disclosure, rather than the simple names of the terms.

Throughout the specification, when a part is described as "comprising or including" a component, it does not exclude another component but may further include another component unless otherwise stated. Furthermore, terms such as " . . . unit," " . . . group," and " . . . module" described in the specification mean a unit that processes at least one function or operation, which may be implemented as hardware, software, or a combination thereof.

Expression "at least one of a, b and c" described throughout the specification may include "a alone," "b alone," "c alone," "a and b," "a and c," "b and c" or "all of a, b and c."

In the present disclosure, a "terminal" may be implemented as, for example, a computer or a portable terminal capable of accessing a server or another terminal through a network. Here, the computer may include, for example, a notebook, a desktop computer, and/or a laptop computer which are equipped with a web browser. The portable terminal may be a wireless communication device ensuring portability and mobility, and include (but is not limited to) any type of handheld wireless communication device, for example, a tablet PC, a smartphone, a communication-based terminal such as international mobile telecommunication (IMT), code division multiple access (CDMA), W-code division multiple access (W-CDMA), long term evolution (LTE), or the like.

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein.

Hereinafter, example embodiments of the present disclosure will be described in detail with reference to the accompanying drawings.

In describing the example embodiments, descriptions of technical contents that are well known in the technical field to which the present disclosure pertains and that are not directly related to the present disclosure will be omitted. This is to more clearly convey the gist of the present disclosure without obscuring the gist of the present disclosure by omitting unnecessary description.

For the same reason, some elements are exaggerated, omitted or schematically illustrated in the accompanying drawings. In addition, the size of each element does not fully reflect the actual size. In each figure, the same or corresponding elements are assigned the same reference numerals.

Advantages and features of the present disclosure, and a method of achieving the advantages and the features will become apparent with reference to the example embodiments described below in detail together with the accompanying drawings. However, the present disclosure is not limited to the example embodiments disclosed below, and may be implemented in various different forms. The example embodiments are provided only so as to render the present disclosure complete, and completely inform the scope of the present disclosure to those of ordinary skill in the art to which the present disclosure pertains. The present disclosure is only defined by the scope of the claims. Like reference numerals refer to like elements throughout.

In this case, it will be understood that each block of a flowchart diagram and a combination of the flowchart diagrams may be performed by computer program instructions. The computer program instructions may be embodied in a processor of a general-purpose computer or a special purpose computer, or may be embodied in a processor of other programmable data processing equipment. Thus, the instructions, executed via a processor of a computer or other programmable data processing equipment, may generate a part for performing functions described in the flowchart blocks. To implement a function in a particular manner, the computer program instructions may also be stored in a computer-usable or computer-readable memory that may direct a computer or other programmable data processing equipment. Thus, the instructions stored in the computer usable or computer readable memory may be produced as an article of manufacture containing an instruction part for performing the functions described in the flowchart blocks. The computer program instructions may be embodied in a computer or other programmable data processing equipment. Thus, a series of operations may be performed in a computer or other programmable data processing equipment to create a computer-executed process, and the computer or other programmable data processing equipment may provide steps for performing the functions described in the flowchart blocks.

Additionally, each block may represent a module, a segment, or a portion of code that includes one or more executable instructions for executing a specified logical function(s). It should also be noted that in some alternative implementations the functions recited in the blocks may occur out of order. For example, two blocks shown one after another may be performed substantially at the same time, or the blocks may sometimes be performed in the reverse order according to a corresponding function.

Figure 1:
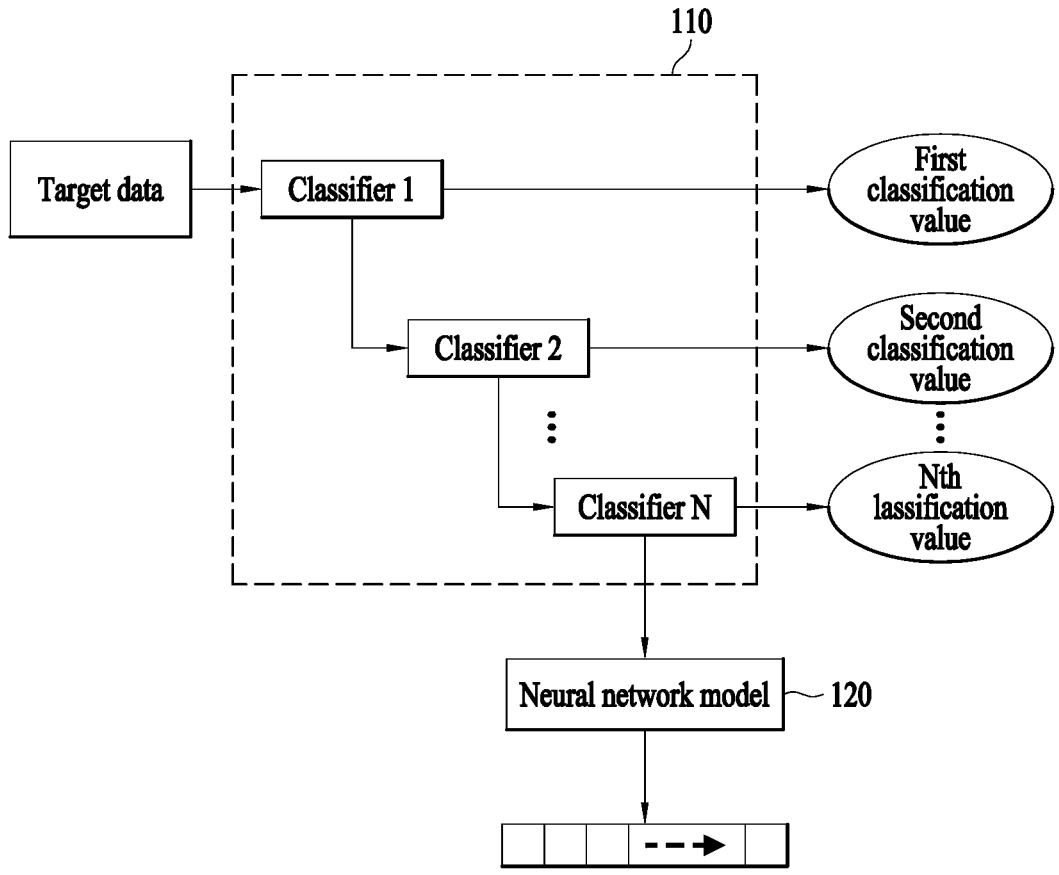
FIG. 1 is a diagram for an example pipeline of a classifier set according to an example embodiment.

FIG. 1 is a diagram for an example pipeline of a classifier set according to an example embodiment.

Referring to FIG. 1, a classifier set 110 may serve to classify data. For example, the classifier set 110 may correspond to a network for classifying an abnormal label. According to the example embodiment, classifiers included in the classifier set 110 may include a neural network, but it is not limited thereto. For example, a model for performing classification according to a predetermined criterion may be included.

The classifier set 110 may include a plurality of classifiers. A plurality of classifiers included in the classifier set 110 may be arranged according to a predefined priority, and the classifiers may operate according to the arrangement order. More details regarding the method of determining the order of operations will be described later with reference to FIG. 4.

Meanwhile, even if FIG. 1 illustrates the embodiment in which the classifiers are sequentially operated one by one, the scope of the present disclosure is not limited thereto. Various embodiments may exist such as that before an operation of a specific classifier ends, an operation of the next classifier is initiated, or that multiple classifiers are initiated together.

The electronic apparatus may classify data using the classifier set 110. According to an example embodiment, the electronic apparatus may further use a neural network model 120 (for example, a general-purpose network) as well as the classifier set 110. For example, the electronic apparatus can calculate the reliability of the result of the classifier by comparing the result of the data classified through the classifier to the trained neural network model 120. Moreover, if the classification result of the classifier set 110 does not satisfy a configured condition (for example, if an abnormal label is not detected in the classifier set 110), the electronic apparatus may further use the neural network model 120 to obtain a classification value of data.

According to an example embodiment, the "target data" of FIG. 1 may include actual data which is to be classified. For example, the target data may be data including various features for "coffee bean". "Coffee beans" may include characteristics such as color, size, and defect. The classifiers of FIG. 1 may be configured in series or in parallel, and may be configured by mixing both, but is not limited thereto.

Referring to FIG. 1, the target data that a user uses for a classifier may include "raw data". Raw data may include one or more types of data to be classified through the classifier set 110. For example, the at least one classifier may classify the target data according to a certain criterion. The certain criterion may correspond to a criterion for classifying actual data through an individual classifier, and may be a criterion for the target data. For example, when the target data of FIG. 1 is data on the "coffee beans," the first classifier may determine whether the target data is about "black" coffee beans according to a criterion related to color characteristics. In this case, the criterion to be classified through the first classifier may correspond to the black coffee beans.

According to an example embodiment, the criterion to be classified by the first classifier may include an abnormal label. That is, the classifier according to various example embodiments of the present disclosure may be configured to classify target data according to a criterion for detecting an abnormal label. As a more specific example, a first classification value, which is an output of classifier 1, is a value indicating whether the target data is classified as the first type of abnormal label, a second classification value, which is an output of classifier 2, is a value indicating whether the target data is classified as the first type of abnormal label, and an Nth classification value, which is an output of the classifier N, may be a value indicating whether the target data corresponds to the nth type of abnormal label.

The neural network model 120 may be used to calculate an overall classification result for the target data. According to an example embodiment, the electronic apparatus may determine whether classification information obtained by using the classifier set 110 satisfies a configured condition, and if the configured condition is not satisfied, the neural network model 120 may be further used. For example, if the classification information obtained using the classifier set 110 does not include a classification value related to the abnormal label, the electronic apparatus may once again identify whether the target data is not abnormal data by performing re-classification using the neural network model 120.

However, it is an example. Thus, according to an example embodiment, the classifier set 110 and the neural network model 120 may always be used together. As such, there may be various example embodiments.

At least some of the classifier sets included in the classifier set 110 may be used for determination based on different criteria. More specifically, in a first classifier included in a plurality of classifiers, it may be determined whether data has a first classification value, in a second classifier including a plurality of classifiers, it may be determined whether data has a second classification value, and the first classification value and the second classification value may be different from each other. For example, if the target data is coffee beans, various types of abnormal labels, such as split beans and pest-damaged beans, may exist, whether the beans are split may be determined by the first classifier, and whether the beans are damaged by pests may be determined by the second classifier. With regard thereto, for the determination, in the classifier according to an example embodiment, it may be determined whether colors in an image or whether the image includes a unique pattern such as a bean-shaped perforation.

The above is an example, and the determination criterion of each classifier do not always have to be different.

The target data may include a plurality of characteristics that satisfy a configured condition (for example, the target data can have multiple abnormal characteristics). As an example of coffee beans, the target data may correspond to an image of coffee beans with black color and signs of damage by insects. In this case, the label for the target data may include both of black beans and insect damaged beans. Further, the corresponding data may be included in both a dataset of the black beans and a dataset of the insect-damaged beans, and may be used for training of a classifier included in the classifier set 110 or for training the neural network model 120.

According to an example embodiment, whether the configured condition is satisfied may be determined on a basis of various characteristics such as colors, patterns, etc. According to an example embodiment, satisfaction of a configured condition may be determined based on the number of inferences on target data. For example, when the number of inferences for target data exceeds the expected number of inference results for the target data, the target data may be determined as abnormal data since the inference may be creating false positives. In other words, this may indicate that the spurious inference result increases uncertainty level in the inference result.

If a certain standard value can be set for these characteristics, specific labels can be identified by the classifier set 110 in advance before inferring through a neural network. In other words, at least some of a plurality of classifiers included in the classifier set 110 may include a set of standard values, and each standard value may be set up during process of which the classifier is learned or made. Label classification may be performed with the standard values.

Figure 2:
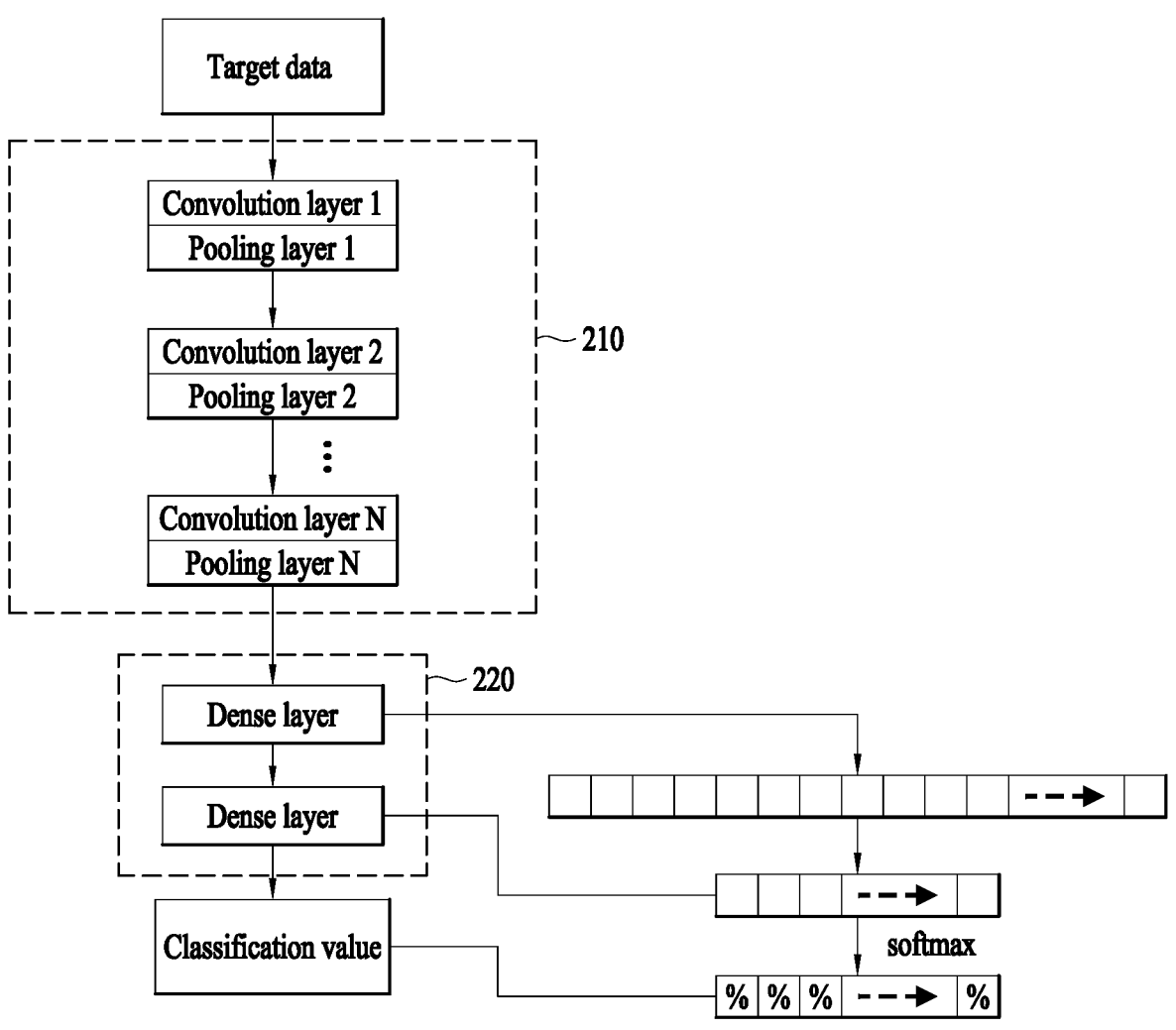
FIG. 2 is a diagram for explaining a neural network model according to an example embodiment.

FIG. 2 is a diagram for explaining a neural network model according to an example embodiment.

With respect to FIG. 2, it is described that the neural network model 120 includes a convolutional neural network (CNN), but it is for convenience of description, and the scope of the present disclosure may extend to the neural network model 120 of various structures based on machine learning technology.

As the example of the neural network model 120, FIG. 2 illustrates the structure of CNN. In this case, neural network model 120 may include one or more among one or more convolution layers, one or more pooling layers and one or more dense layers. More specifically, in the illustrated structure of the CNN, 1) a convolutional layer and a pooling layer may be continuously connected to adjust the width, height, and channel values, 2) after flattening, the network may go through the fully connected layer and reduce the number of labels, and 3) the result may be calculated as a percentage value by using Softmax operation.

According to an example embodiment, after the convolution layer, a pooling layer is executed, as indicated in reference numeral 210. In addition, the dense layer, as shown in reference numeral 220, may correspond to a common layer and may include one or more of a fully connected layer and an inner product layer. The dense layer may refer to a layer that is connected to all nodes of the layers.

According to an example embodiment, a neural network that identifies whether a specific condition is satisfied in the target data may be used. For example, the electronic apparatus may input target image data to the neural network model 120, and the neural network model 120 may identify whether the target image includes a black object. Further, according to another example embodiment, an image detecting neural network may be used to determine whether the number of objects to be recognized in the object data satisfies a configured condition. For example, the electronic apparatus may input the target image data to the neural network model 120, and the neural network model 120 may identify whether the image includes one coffee bean object.

According to an example embodiment, in the neural network model 120, all labels related to the target data may be identified. The electronic apparatus according to an example embodiment may obtain classification information first by using the classifier set 110 and then further obtain classification information by using the neural network model 120 (according to an example embodiment, classification information may be further obtained by using the neural network model 120, and the neural network model 120 may not be used).

In this case, in the neural network model 120 according to an example embodiment, the convolution layer and the pooling layer repeat and go through multiple channels and sizes. After the flattening operation, the fully connected layer is used to generate inference results as many as the desired number of labels. After that, the final value is converted to a probability distribution through the Softmax operation.

Figure 3:
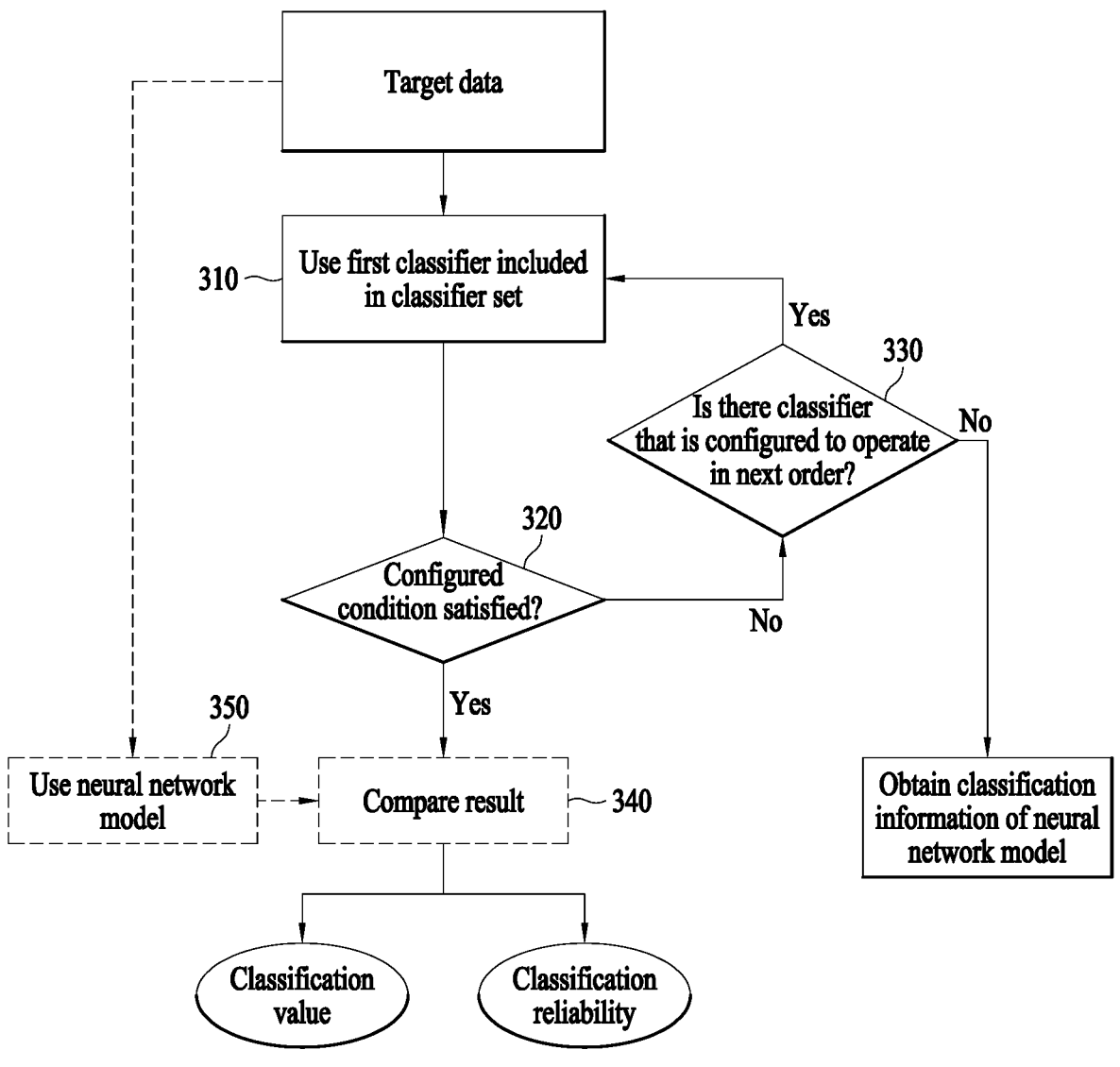
FIG. 3 is a flowchart for explaining a data classification method using a classifier set according to an example embodiment.

FIG. 3 is a flowchart for explaining a data classification method using a classifier set according to an example embodiment.

With respect to FIG. 3, a method of classifying data using the classifier set 110 by an electronic apparatus according the example embodiment is described. As described with regard to FIG. 1, with regard to the plurality of classifiers included in the classifier set 110, the number of the plurality of classifiers may be referred to as N, and each classifier may be referred to as classifier 1, classifier 2, . . . and classifier N. With regard thereto, the classifiers may be sequentially numbered according to a set operation order (in other words, the order may be set that classifier 1 operates first, then classifier 2 and so on one by one, and finally classifier N operates).

The electronic apparatus may use a first classifier included in the plurality of classifiers based on target data in operation 310. It should be noted that a "first classifier" is not the same concept as "classifier 1". More specifically, the "first classifier" may correspond to one of classifier 1 to classifier N. Which one of the various classifiers corresponds to the first classifier also varies depending on an example embodiment, and even in a particular example embodiment, it may vary depending on which operation is being performed.

The first classifier initially used by the electronic apparatus according to an example embodiment may be understood as "classifier 1". This may be because the order of operation is set so that classifier 1 operates first. However, the scope of the present disclosure is not limited thereto. For example, various example embodiments may further exist in which the first classifier used initially is determined as a classifier other than classifier 1, such as when there is a user request or there is a reason to operate by changing the order even if there is no user request.

According to an example embodiment, operation 310 may include an operation of loading information of the classifier set 110.

The electronic apparatus may determine whether output information of the first classifier satisfies a configured condition in operation 320. If the output information of the first classifier satisfies the configured condition (Yes) in operation 320, the electronic apparatus may determine the output information of the first classifier as classification information (hereinafter, for convenience of description, the classification information of the classifier set 110 is referred to as "first classification information") of the classifier set 110. However, if the output information of the first classifier does not satisfy the configured condition (No) in operation 320, the electronic apparatus may determine whether there is a second classifier configured to operate in the next order of the first classifier in operation 330.

A case where the output information satisfies a configured condition may include, for example, a case where abnormality attributes related to the target data are detected, but the scope of the present disclosure is not limited thereto.

Further, a case where the output information satisfies a configured condition may include, for example, a case where the output value exceeds a set standard value.

In addition, the specific contents of the "configured condition" related to the output information may be different for each classifier. For example, a standard value related to classifier 1 and a standard value related to classifier 2 may have different values. Conditions related to each classifier may be determined in the process of training or generating the classifier, but the scope of the present disclosure is not limited thereto. For example, various example embodiments may exist, such as receiving input of conditions from an external apparatus or a user.

Meanwhile, an example of the "configured condition" may include a standard value expressed as a probability value that is a result of the Softmax operation, but the scope of the present disclosure is not limited thereto.

If the second classifier configured to operate in the next order of the first classifier exists among the plurality of classifiers (Yes) in operation 330, the electronic apparatus may use the second classifier based on the target data (back to operation 310). In this case, the electronic apparatus may re-determine whether the second classifier satisfies the configured condition. If the configured condition is not satisfied, it may be determined whether there is a third classifier configured to operate in the next order of the second classifier. At least some of operation 310, operation 320 and operation 330 may be repeated. In other words, in the case of using the second classifier, the operation may be understood as the same as in the case of using the first classifier described above. As a result, if the electronic apparatus fails to obtain output information that satisfies the configured condition, it may continue to operate the next classifier.

Further, if there is no second classifier configured to operate in the next order of the first classifier (No) in operation 330, the electronic apparatus may obtain information indicating that the configured condition is not satisfied. With regard thereto, the information indicating that the configured condition is not satisfied does not have to explicitly inform the dissatisfaction of the condition. For example, even if separate output information is not provided, if the electronic apparatus can identify that the operation of the classifier set 110 is ended, it may identify that the target data does not satisfy the configured condition, and thus, even in this case, information indicating that the configured condition is not satisfied may be obtained.

Furthermore, if there is no second classifier configured to operate in the next order of the first classifier, the electronic apparatus according to an example embodiment may obtain classification information using the neural network model 120 (hereinafter, for convenience of explanation, the classification information of the neural network model 120 is referred to as "second classification information").

Further, according to an example embodiment, even when the first classification information, which is output information of the first classifier, satisfies a configured condition, the electronic apparatus may further obtain second classification information using the neural network model 120 in operation 350, and may compare the first classification information and the second classification information in operation 340. Through this, the electronic apparatus may verify the classifier set 110, and this may include, for example, determining the reliability of the first classification information obtained from the classifier set 110. In addition to the verification, the electronic apparatus may change the classification value itself based on the second classification information (for example, when a label indicated by the first classification information is different from a label indicated by the second classification information, the label indicated by the second classification information may be determined as the final classification), and further use of the neural network model 120 may provide various advantages.

Meanwhile, as described above, the electronic apparatus according to an example embodiment may obtain classification information using the neural network model 120 only when there is no second classifier configured to operate in the order following the first classifier. Alternatively, the second classification information may not be further obtained in all cases, although not limited to the case where there is no second classifier configured to operate in the order following the first classifier. For example, whether the first classification information is reliable may be verified by additionally obtaining second classification information only for some of the cases where the first classification information satisfies the configured condition. As described, various example embodiments may exist regarding whether to use the neural network model 120 and conditions for using the neural network model 120.

In addition, whether to use the neural network model 120 and when to use the neural network model 120 may vary, depending on whether the situation of using the classifier set 110 is a situation of training the classifier set 110 or a situation of actually using the trained classifier set 110 to classify target data. For example, in FIG. 3, since the classifier set 110 is actually used to classify the target data, the neural network model 120 is used only in some situations to secure the inference speed, but when training the classifier set 110, comparison between the first classification information and the second classification information may be performed more frequently (with regard thereto, as the classifier set 110 is trained well through comparison between the first classification information and the second classification information, the reliability of the classification result obtained by using the classifier set 110 in a later inference operation increases, and as a result, it will be possible to reduce the reliability on the neural network model 120, and thus it may be understood that at which operation the intervention of the neural network model 120 is increased is an option in a kind of trade-off relationship).

According to an example embodiment, a degree of similarity between first classification information and second classification information is evaluated using the Top-K accuracy method.

The abnormal label detected by the classifier may be identified through the last network. Data processing through classifiers may be less demanding than data processing through a network. This may be because classifiers can be constructed without utilizing a neural network.

The Top-K accuracy method may be a method of identifying K number of labels in the order of highest probability among the probabilities of each label included in the classification information, and comparing the K number of labels with other classification information to be compared. With regard thereto, K may be the constant value defined before inference. For example, Top-1 or Top-5 may be used.

With regard thereto, one or more of the first classification information and the second classification information may include a plurality of candidate classification values. Meanwhile, the plurality of candidate classification values may include the label itself or may include information of a value that may indicate a specific label, and the form is not limited to a specific method.

As a more specific example in relation to the Top-K accuracy method, if the second classification information includes a plurality of candidate classification values, the electronic apparatus may determine one or more candidate classification values that satisfy a configured criterion among the plurality of candidate classification values included in the second classification information, and may identify whether each of the determined one or more candidate classification values matches a classification value indicated by the first classification information, in order to compare the first classification information and the second classification information. In this case, the configured criterion may be a criterion related to probabilities that data belongs to each of the plurality of candidate classification values (for example, it may be a criterion of selecting one or more probabilities which are in the top K, among all probabilities, when sorted by their values, or a criterion of selecting one or more probabilities exceeding a certain value, but the scope of the present disclosure is not limited to the specific example embodiments).

For convenience of explanation, the case where the second classification information includes a plurality of candidate classification values is described, but according to an example embodiment, the first classification information may include a plurality of candidate classification values, and both the first classification information and the second classification information may include a plurality of candidate classification values. Even in the case, the comparison method between classification information may apply mutatis mutandis the above description.

According to an example embodiment, the electronic apparatus may determine that the classification result is correct if there is a value identical to the comparison target among one or more candidate classification values determined. For example, the Top-K accuracy method can be defined as $C_{j,k}(q_j)$ below:

$$C_{j,k}(q_j)=\{y[j,i]\in Y|1\leq i\leq k,1\leq j\leq m\}$$

wherein, $q_j$: normalized Softmax value for classifier j;

m: number of classifiers;

Y: A set of labels that can be classified in the last neural network; and $C_{j,k}(q_j)$: Top-k prediction about classifier j.

With regard to the Top-K accuracy method, the smaller K is set, the stricter the accuracy determination method may be. For example, if K is 1, the prediction may be determined to be accurate only when the classifier output and the neural network classification result exactly match. However, if K is set as a high value, the classification result is determined to be reliable as long as it belongs to one of the top K number of predictions, and the range of reliable results may be broadened.

As described above, if all the classifiers fail to classify, a final output may be obtained by the neural network model. On the other hand, if one of the classifiers succeeds to classify a specific label, the final output may be obtained by the intermediate classifier. In this case, the neural network model may be used to ensure the reliability of the final result.

Meanwhile, if reliability does not reach a target level, the operation order of a plurality of classifiers included in the classifier set 110 may be adjusted. This will be described later with reference to FIG. 4.

Figure 4:
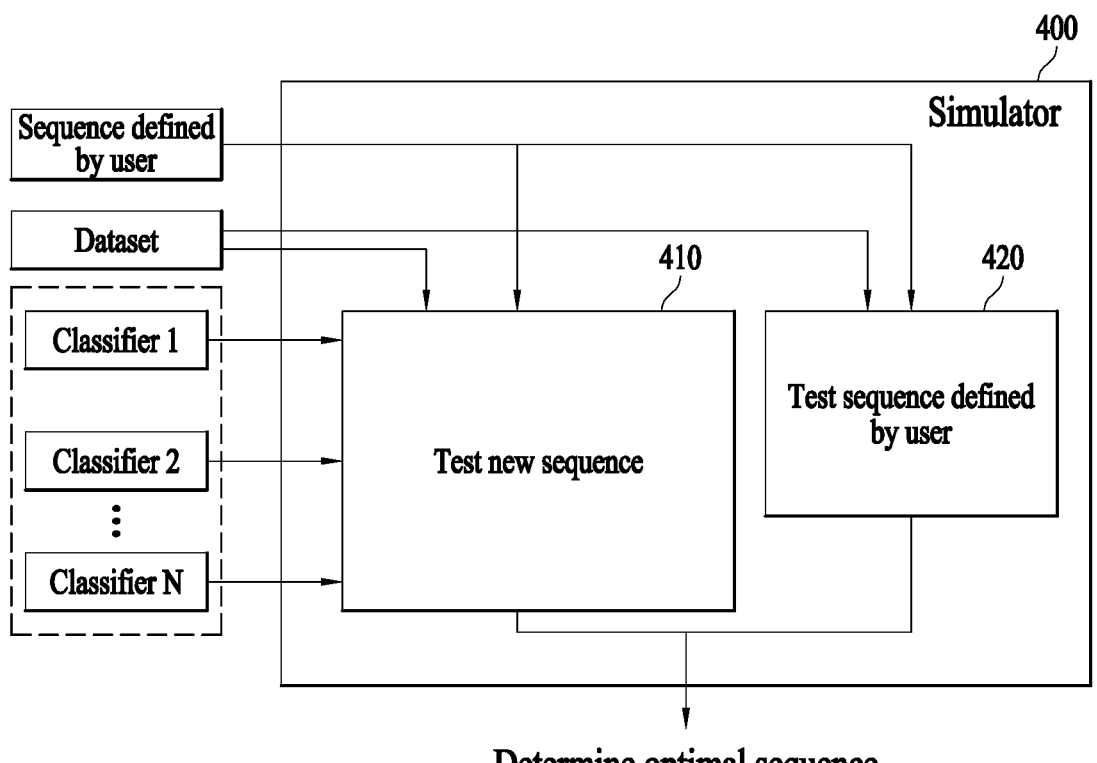
FIG. 4 is a diagram for explaining a method of determining an operation sequence of a plurality of classifiers according to an example embodiment.

FIG. 4 is a diagram for explaining a method of determining an operation sequence of a plurality of classifiers according to an example embodiment.

Referring to FIG. 4, a simulator 400 may determine an operating method of the classifier set 110 based on a result of comparing first classification information and second classification information. The "operating method" of the classifier set 110 may include an operation sequence of a plurality of classifiers.

A subject that determines the operating method of the classifier set 110 may be an electronic apparatus, but the scope of the present disclosure is not limited thereto. It may be understood as abstracting the subject that determines the operation sequence and expressing and explaining it as a "simulator". Therefore, operations described as being performed by the "simulator" may be performed by an electronic apparatus or other external apparatuses.

The operation of the simulator 400 to determine the operation sequence of the plurality of classifiers may include an operation of testing a new sequence as indicated in reference numeral 410, and may include an operation of testing a sequence defined by a user as indicated in reference numeral 420. The operation of testing a sequence defined by a user as indicated in reference numeral 420 may include, for example, testing a sequence of classifiers that are empirically established by a user. The operation of testing a new sequence as indicated in reference numeral 410 may include testing a new sequence that is not user-defined.

As a result, the processing speed, accuracy, and efficiency of both testing operations are compared to derive the optimal sequence of classifier. Since the input data has multiple abnormal label properties (for example, there may be beans that are black in color and in poor condition, and if the beans are classified as poor, the operation of the classifier set 110 is terminated, so that even black beans may not be classified), accuracy comparisons can be to verify that they are properly classified by the base specified classification.

FIG. 4 shows an example process where the simulator 400 takes three as inputs. The inputs are described as follows.

1) User-defined Sequence: User's desired sequence

The frequency of each normal or abnormal labels is different according to the characteristics of the object. The user can empirically determine the order of the classifiers.

2) Classifiers and networks used in the user-defined sequence

All classifiers used in the user-defined sequence may be entered as input respectively. The simulator 400 may obtain information including actual classification time and accuracy. When obtaining the information, the test may be performed using the same dataset as for training the classifiers.

For reference, in the above described Top-K accuracy method, only the method for determining accuracy is described, but in practice, the sequence may be determined by considering not only the accuracy but also the inference speed. In other words, the electronic apparatus may determine the operating method of the classifier set 110 based on not only the result of comparing the first classification information and the second classification information, but also the information on time required for the classifier set 110 to generate the first classification information.

3) Dataset used in the above classifiers

Operation results according to the order of classifiers may be compared by the simulator 400. With regard thereto, comparison may be performed using the input dataset.

A user-defined sequence may correspond to a sequence desired by a user. The user-defined sequence may be determined based on an empirical determination of the object, and may be a reasonable sequence thought by the user. For example, it may be a sequence determined in consideration of efficiency, classification speed, and the order of target labels of classifiers. However, since there is no guarantee that the heuristic sequence is effective for computers due to differences in thinking process between humans and computers, the simulator 400 may determine an optimal sequence by comparing the classification time and accuracy of the sequence generated by the user and the sequence calculated inside the computer apparatus.

According to an example embodiment, using the simulator 400, the operation of the NPU may be previewed on the workstation. At this operation, the speed of the various classifiers and the accuracy of the labels may be tested. This may be reflected in the priorities of pipeline construction. Finally, simulation results may include optimized classifier sequences.

Meanwhile, in a process of classifying actual data, the electronic apparatus according to an example embodiment may determine the reliability of the first classification result and determine whether the reliability of the first classification result exceeds a configured threshold value. When the reliability is less than the configured threshold value, the electronic apparatus may change the operating method of the classifier set, and for example, this may include a case in which the operation order of a plurality of classifiers is changed. In other words, operation of the simulator 400 in FIG. 4 may be performed not only during the designing and training process of the classifier, but also when it is determined that the reliability of the classification result of the classifier set 110 is low as a result of classifying actual data.

Figure 5:
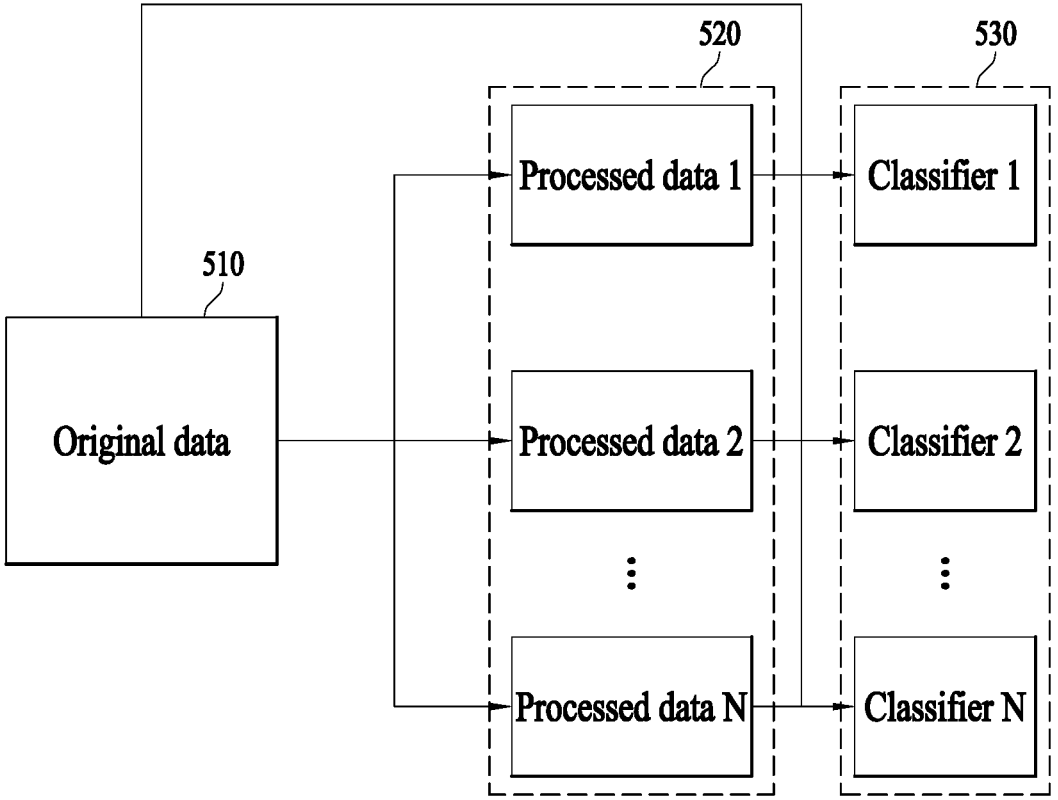
FIG. 5 is a diagram for illustratively explaining a process of training a plurality of classifiers according to an example embodiment.

FIG. 5 is a diagram for illustratively explaining a process of training a plurality of classifiers according to an example embodiment.

Referring to FIG. 5, the electronic apparatus according to the example embodiment may obtain original data 510 and obtain processed data 520 by processing the original data 510, and the electronic apparatus may train a plurality of classifiers 530 by using the obtained processed data as target data.

According to an example embodiment, since it is possible to identify which labels can be easily classified by each classifier, the classifier may be easily trained by obtaining the processed data 520 in consideration of the characteristics of each classifier. For example, in order to train the classifier to classify "black beans," an image of the black coffee beans may be generated and used through processing that randomly changes the color of the original data.

In addition to the color change method, various methods such as rotation, scaling, a positional movement, and cut and paste may be used for data processing.

Meanwhile, in the example embodiment illustrated in FIG. 5, the case of generating and using the different processed data 520 for training of each classifier is described, but according to an example embodiment, the same processed data 520 may be used for training of at least some of the plurality of classifiers. As such, various example embodiments may exist.

Figure 6:
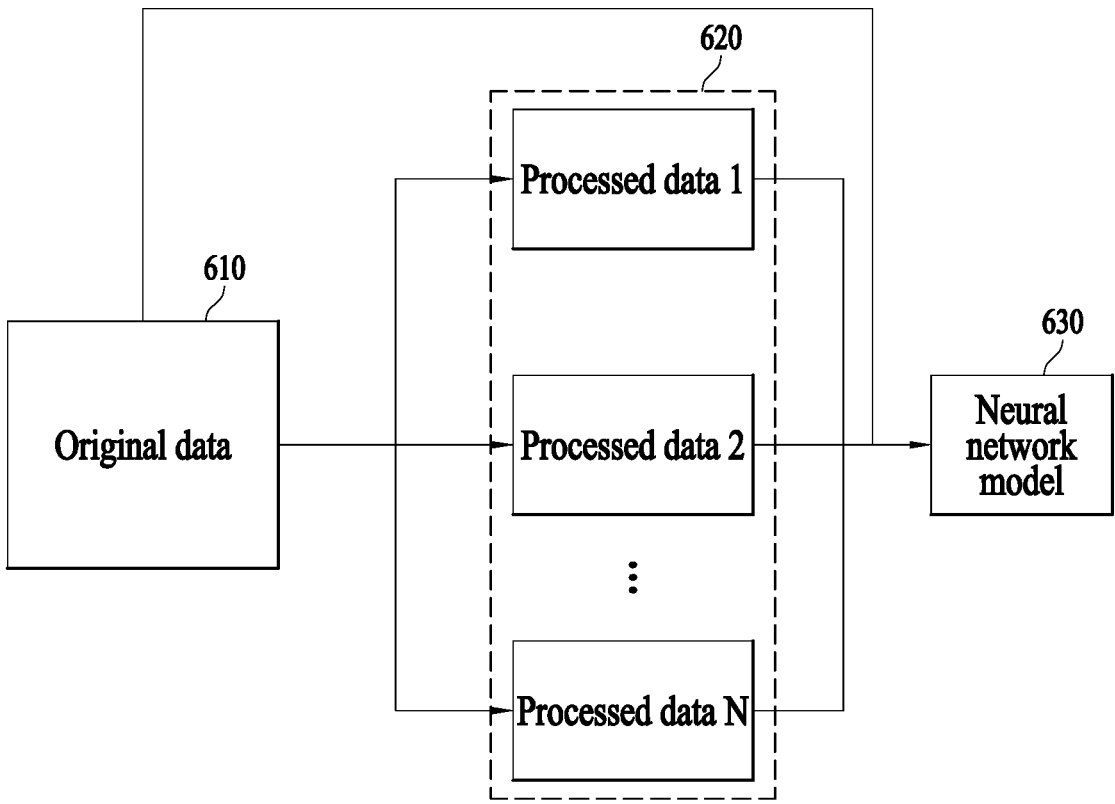
FIG. 6 is a diagram for illustratively explaining a process of training a neural network model according to an example embodiment.

FIG. 6 is a diagram for illustratively explaining a process of training a neural network model according to an example embodiment.

Referring to FIG. 6, an electronic apparatus according to the example embodiment obtains original data 610, processes the original data 610 to obtain processed data 620, and may train a neural network model 630 by using the obtained processed data as target data. In the case of the classifier set 110, the processed data 620 could be configured differently by considering the characteristics of each classifier. However, since the neural network model 630 aims to classify all labels, training may be performed by using all the processed data 620.

As described above, if the first classification information obtained by using the classifier set 110 does not satisfy the configured condition, the neural network model 630 may be used to classify target data. Further, even if the first classification information obtained by using the classifier set 110 satisfies a configured condition, the neural network model 630 may be used for verification.

FIG. 7 is a diagram for illustratively explaining a method of classifying data using one or more processors for neural processing according to an example embodiment.

Referring to FIG. 7, the electronic apparatus according to the example embodiment may process at least some of the operations using a processor for neural processing 700. More specifically, the electronic apparatus according to the example embodiment may access the processor for neural processing 700, and the processor for neural processing 700 may process at least some of an operation for obtaining first classification information (the classification information of the classifier set 110), an operation for obtaining second classification information (the classification information of the neural network model 120), and an operation for comparison of the first classification information and the second classification information.

The processor for neural processing 700 includes the NPU, but is not limited thereto. Hereinafter, for convenience of explanation, some operations of the processor for neural processing 700 is described using the NPU as an example embodiment, but the intention of the description is not to specify the processor for neural processing 700 as the NPU, nor is it limited to the case where the processor for neural processing 700 corresponds to an independent physical apparatus. Therefore, even when the NPU is described as an example, the description may be applied to various types of processor for neural processing 700.

The processor for neural processing 700 may include a plurality of NPU modules. FIG. 7 shows an example hierarchical architecture of the neural processing processor. In this example architecture, multiple neural processing units are hierarchically organized in order to support the hierarchical architecture of the multiple neural networks for the classification of data (for example, the abnormal object detection) in a more efficient way in the present disclosure.

The example hardware architecture may include one or more sets of neural processing unit (NPU) modules, e.g., 'NPU Module Set'(s) 1 through M, which is generalized as the "processor for neural processing 700" in FIG. 7. In turn, each NPU module set may include one or more neural processing unit (NPU) modules, e.g., 'Module' 1 through N in FIG. 7.

1) NPU Module Set

Each NPU module set may consist of common instruction cache and data transfer module. The common instruction cache and data transfer module may handle the data transfer between external memory and each of the NPU modules set(s). The common instruction cache (CIC) may retrieve instructions from the external memory and may send them to the RISC-V cores in the NPU modules. Instructions may be stored in DDR memory. The data transfer module may be used for transferring data between external memory, e.g., DDR, and internal memory (e.g., NPU module memory blobs).

2) NPU Module

Each module may consist of RISC-V Core, control processor, NPU DNN layer accelerator, NPU module memory blob(s), and data control port.

The RISC-V processor in each NPU module may execute its own instruction stream, fetching from memory using its program counter (PC).

The control processor is the co-processor for the NPU and may interface the RCORE with the NPU and associated logic within the NPU module. It may include the NPU module registers and may coordinate the control flow between the NPU, the local memory blobs, and the data transfer module. It may also provide the interface for the Host CPU 710 to access the NPU module registers, memory blobs, and internal memory for the RISC-V processor.

To start program execution in the RISC-V processor, the host/control processor may execute one or more of the following steps.

1) Initialize the code section—load the executable code module for a NPU module into DDR memory 2) Pass the entry point for the code to the RISC-V processor—by setting an entry point for the iCache base address where executable code is expected for the NPU module 3) Start the NPU module—write the Configuration 0 register with the start instruction This may initiate execution on the NPU module processor, e.g., RISC-V processor. The program counter (PC) may be initialized, and the first instruction may be fetched from DDR at iCache base address.

Since the NPU modules are organized in a hierarchical structure in the example hardware architecture, the hierarchical architecture of the multiple neural networks for the classification of data may be aligned well with the hardware architecture. The number of multiple neural networks does not have to be equivalent to the number of NPU modules sets, or the number of NPU modules. Instead, when the neural network hyper-parameter are updated in each layer of each neural network, repetitive multiplication and addition instructions may be allocated in such a way to take advantage of the hierarchical structure in the example hardware architecture. This may help to divide the entire amount of calculation data in consideration of the hierarchical structure and allocate each divided segment of the calculation data for each NPU module in a natural way.

FIG. 8 is a diagram for illustratively explaining a method of designing a classifier set according to an example embodiment.

Referring to FIG. 8, a dataset 820 not satisfying a configured condition may enter all classifiers as indicated by reference numeral 830 equally, while a dataset 810 satisfying the configured condition may be specialized for each classifier. The dataset 820 not satisfying the configured condition may include a set of normal images, and the dataset 810 satisfying the configured condition may include a set of abnormal images.

However, while the dataset 810 satisfying the configured condition includes input values specialized for each of an individual classifier, each may be independent, an intersection may be included because there may exist an image set in which multiple features is superimposed. For example, since one image may have multiple characteristics, an intersection may be included. In this case, regarding the intersection data, it may be determined which features (characteristics) are to be classified as important.

During the inference process (which is, a process of actual data classification), quantized multiple classifiers can be executed at the same time using an NPU supporting multi-cores. An optimized scheduling may be performed to minimize the time it takes for all classifier results to come out. In this case, the faster the inference speed of each classifier is, the more advantageous it may be for scheduling. Each classifier may be created for each of abnormal types in order not to duplicate the meaning of using each classifier. However, the scope of the present disclosure is not limited thereto.

These processes can be summarized as follows.

1) The dataset 810 satisfying the configured condition may be classified into N number of sub-datasets according to their types.

2) N number of datasets may be generated by combining the dataset 820 not satisfying the configured condition for each sub-dataset.

3) N number of classifiers may be generated by using the N number of datasets generated in above 2).

FIG. 9 is a diagram for illustratively explaining an operation scheduling method related to how to process an operation of each classifier according to an example embodiment.

Referring to FIG. 9, if an operation for obtaining first classification information is processed in a multi-core processor for neural processing (hereinafter, referred to as an NPU for convenience of explanation), the electronic apparatus may obtain information on an amount of computation required for its operation for each of a plurality of classifiers, and may determine which one of the plurality of cores to assign the operation for each of the plurality of classifiers based on the information on the amount of required computation. In the processor for neural processing that supports multiple cores, a plurality of different operations are executed in parallel, and the fastest and most effective operation processing may be achieved by determining which cores to assign operations to.

According to an example embodiment, a simulation may be performed according to the method below, and a method having the fastest inference speed may be determined.

1) Calculate the average NPU inference speed of each classifier. Then, the classifier may be sorted according to the inference speed. The number of classifiers are expressed as N and the number of cores in the NPU are expressed as M.

a) When N>M, the NPU cores may be assigned sequentially from a classifier with the slowest inference speed (for example, from a classifier that requires larger computations for that classification). After one classifier is assigned to each of the cores, a classifier with the slowest inference speed among unassigned classifiers may be assigned to the core to which the classifier in which a classifier with the fastest inference speed is assigned. When all classifiers are allocated, one classifier with slow inference speed or multiple (for example, two) classifiers with high inference speed may use one core.

b) When N<M, one core may be assigned to each classifier. The remaining cores may further be allocated starting with the classifier with the slowest inference speed.

2) Among the layers constituting the classifier, operations that require a large amount of computation, such as convolution operations or fully connected operations, may show better performance when calculated with multi-cores. Therefore, depending on example embodiment, at least some cores of the MPU may be used to prioritize convolution operations or fully connected operations.

3) By mixing 1) and 2), an inference sequence is constructed in consideration of the NN complexity of the classifier. If the inference time of the classifier is greater than or equal to the reference value, as in 2), operations may be assigned with priority, and operation 1) may be applied to the remaining classifiers with quick inference speed, and finally the inference results of all classifiers are obtained.

The example embodiment of a result of scheduling which operation to assign to a plurality of processors (or a plurality of cores) is illustrated in FIG. 9, as indicated in reference numeral 910. Referring to FIG. 9, the operation of classifier 1 and the operation of classifier 2, which require a large amount of computation, may be performed first using a plurality of cores (in the case of an example embodiment, using all cores), and after one core is assigned to each of remaining classifier 3 to classifier 8, one additional core may be assigned to classifier 3 and classifier 4, which have a relatively slow inference speed.

Meanwhile, according to an example embodiment, the electronic apparatus may determine the computing power of each of a plurality of cores related to the processor for neural processing, and the electronic apparatus may determine which one of the plurality of cores to assign the operation for each of the plurality of classifiers further based on the computing power of each of the plurality of cores. In other words, in the example embodiment of FIG. 9, allocation is made considering only the amount of computation required for each classifier without considering the computing power between cores, but if there is a significant difference in the computing power between the cores, scheduling may be performed in which a core with relatively good computing power is assigned to a classifier having a relatively slow inference speed, for example, in consideration of the difference.

According to an embodiment, the classifier distribution matching for the multi-core NPU of FIG. 9 may be performed based on the processing speed efficiency of hardware and the classifier setting in FIG. 4. As in the example of FIG. 9, when the NPU is multi-core, the previous classifier setting (e.g., user-defined sequence) may be reflected at least partially when the processing speeds of individual classifiers are similar. That is, the classifier system of the present disclosure may partially consider classifier settings and may consider a user-defined sequence for individual classifiers having similar processing speeds.

Meanwhile, the electronic apparatus according to an example embodiment may determine an operating method of the classifier set 110 further based on information of time required for the classifier set 110 to generate first classification information. With regard thereto, the information on the time required for the classifier set 110 to generate the first classification information may be determined by further considering characteristics (for example, in the case of a multi-core NPU, the number of cores and the computing power of each of the cores) of an apparatus that processes the operation. Through the process of determining the required time information in consideration of the characteristics of the apparatus as described above, the operating method of the classifier set 110 may be determined by reflecting the characteristics of the apparatus.

FIG. 10 is an operation flowchart of a data classification method of an electronic apparatus according to an example embodiment.

Referring to FIG. 10, the electronic apparatus according to the example embodiment obtains target data in operation 1010. For example, the target data may be data including various characteristics of "coffee beans".

The electronic apparatus may obtain first classification information by using the classifier set 110 including a plurality of classifiers based on the target data in operation 1020, and the electronic apparatus may obtain second classification information by using the neural network model 120 based on the target data in operation 1030. According to an example embodiment, the first classification information and the second classification information may include one or both of information about whether the target data is abnormal and information about the reason for abnormality when the target data is abnormal. For example, each of the first classification information and the second classification information may include at least one of information as a result of determining whether the data is normal "coffee bean" image and, if the data is abnormal, information on what abnormality attribute the data has.

The electronic apparatus may compare the first classification information and the second classification information in operation 1040. The electronic apparatus may verify the classifier set 110 based on a result of comparing the first classification information and the second classification information in operation 1050. The operation of verifying the classifier set 110 may be understood as a board concept including not only the operation of evaluating the appropriateness of the operation of the classifier set 110 but also the operation of training the classifier set 110 so that the first classification information matches the second classification information.

Operation 1010 to operation 1050 may correspond to operations for training the classifier set 110, but the present disclosure is not limited thereto. For example, above described operation 1010 to operation 1050 may include some example embodiments classifying actual data.

Meanwhile, the actual data classification operation is not limited to above operation 1010 to operation 1050. For example, in above operation 1030 to operation 1050, the neural network model 120 is used, but in a case of actual data classification, the neural network model 120 may not be used. There may be various example embodiments such as a case where, if the first classification information does not satisfy a configured condition (for example, if an abnormal label is not detected in the classifier set 110), the electronic apparatus may obtain a second classification value by further using the neural network model 120. Meanwhile, when the first classification information does not satisfy the configured condition, if the electronic apparatus further uses the neural network model 120, without comparing the first classification information and the second classification information, a classification value of the target data may be immediately determined based on the second classification information.

However, when the first classification information does not satisfy the configured condition, if the electronic apparatus further uses the neural network model 120, even if the first classification information satisfies the configured condition, second classification information may be obtained by the neural network model 120 further being used to evaluate its reliability, and an operation for verification by comparing the first classification information with second classification information may be performed. As such, the present disclosure includes various example embodiments.

FIG. 11 is an example diagram of a configuration of an electronic apparatus for classifying data according to an example embodiment.

Referring to FIG. 11, the electronic apparatus includes a transceiver 1110, a processor 1120 and a memory 1130. The electronic apparatus may be connected to an external apparatus and a processor for neural processing through the transceiver 1110, and exchange data.

The processor 1120 may include at least one of the apparatuses described above with reference to FIGS. 1 to 10, or may perform at least one method described above with reference to FIGS. 1 to 10. The memory 1130 may store information for performing at least one method described above through FIGS. 1 to 10. The memory 1130 may be volatile memory or non-volatile memory.

The processor 1120 may execute a program and control an electronic apparatus. Program codes executed by the processor 1120 may be stored in the memory 1130.

Further, an electronic apparatus according to an example embodiment may further include an interface that provides information to a user.

Meanwhile, in the present disclosure and drawings, example embodiments are disclosed, and certain terms are used. However, the terms are only used in general sense to easily describe the technical content of the present disclosure and to help the understanding of the present disclosure, but not to limit the scope of the present disclosure. It is apparent to those of ordinary skill in the art to which the present disclosure pertains that other modifications based on the technical spirit of the present disclosure may be implemented in addition to the example embodiments disclosed herein.

An apparatus or a terminal according to the above described example embodiments may include a processor, a memory for storing and executing program data, permanent storage such as disk drives, communication ports to communicate with external apparatuses and user interface apparatuses such as touch panels, keys and buttons. Methods implemented as software modules or algorithms are computer readable codes or program instructions executable on the processor, and may be stored on a computer-readable recording medium. Here, the computer-readable recording medium includes a magnetic storage medium (for example, a read-only memory (ROM), a random-access memory (RAM), a floppy disk and a hard disk) and an optically readable medium (for example, a CD-ROM, a digital versatile disc (DVD)). The computer-readable recording medium may be distributed among network-connected computer systems, so that a computer-readable code may be stored and executed in a distributed manner. The medium may be readable by a computer, stored in a memory, and executed on a processor.

The example embodiments may be represented by functional block elements and various processing steps. The functional blocks may be implemented in any number of hardware and/or software configurations that perform specific functions. For example, an example embodiment may adopt integrated circuit configurations, such as memory, processing, logic and/or look-up table, that may execute various functions by the control of one or more microprocessors or other control apparatuses. Similar to that elements may be implemented as software programming or software elements, the example embodiments may be implemented in a programming or scripting language such as C, C++, Java, assembler, Python, etc., including various algorithms implemented as a combination of data structures, processes, routines, or other programming constructs. Functional aspects may be implemented in an algorithm running on one or more processors. Further, the example embodiments may adopt the existing art for electronic environment setting, signal processing and/or data processing. Terms such as "mechanism," "element," "means" and "configuration" may be used broadly and are not limited to mechanical and physical elements. The terms may include the meaning of a series of routines of software in association with a processor or the like.

The above-described example embodiments are merely examples, and other embodiments may be implemented within the scope of the claims to be described later.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for classifying data in an electronic apparatus, comprising:

obtaining target data;

obtaining first classification information by using a classifier set including a plurality of classifiers based on the target data;

obtaining second classification information by using a neural network model based on the target data;

comparing the first classification information and the second classification information; and verifying the classifier set based on a result of comparing the first classification information and the second classification information, wherein at least one of the first classification information and the second classification information includes a plurality of candidate classification values, wherein if the second classification information includes the plurality of candidate classification values, the comparing the first classification information and the second classification information includes:

determining one or more candidate classification values that satisfy a configured criterion among the plurality of candidate classification values included in the second classification information; and identifying whether each of the one or more candidate classification values matches a classification value indicated by the first classification information, wherein the configured criterion is a criterion related to probabilities that data belongs to each of the plurality of candidate classification values, and determining by the electronic apparatus, scheduling of an operation performed by a core, among a plurality of cores of a processor, to be assigned to the operation for each of the plurality of classifiers based on each classifier requirements for an amount of computation needed for the operation and computing power of each of the plurality of cores.

2. The method of claim 1, further comprising, based on the result of comparing the first classification information and the second classification information, determining an operating method of the classifier set, wherein the operating method of the classifier set includes an operation sequence of the plurality of classifiers.

3. The method of claim 2, wherein the electronic apparatus determines the operating method of the classifier set further based on information of time required for the classifier set to generate the first classification information.

4. The method of claim 2, wherein the determining the operating method of the classifier set, includes:

based on the result of comparing the first classification information and the second classification information, determining reliability of the first classification information;

determining whether the reliability exceeds a configured threshold value; and if the reliability is less than the configured threshold value, changing the operating method of the classifier set.

5. The method of claim 1, wherein the obtaining the first classification information includes:

using a first classifier included in the plurality of classifiers based on the target data;

if output information of the first classifier satisfies a configured condition, determining the output information of the first classifier as the first classification information; and if the output information of the first classifier does not satisfy the configured condition, if a second classifier configured to operate in an order following the first classifier is present among the plurality of classifiers, using the second classifier based on the target data; and if the second classifier is not present, obtaining information indicating that the configured condition is not satisfied.

6. The method of claim 1, wherein the first classification information and the second classification information include at least one of information on whether the target data is abnormal data, and if the target data is abnormal, information on a reason for an abnormality.

7. The method of claim 1, further comprising accessing a processor for neural processing, wherein the processor for neural processing processes at least some of an operation for obtaining the first classification information, an operation for obtaining the second classification information and an operation for comparing the first classification information and the second classification information.

8. The method of claim 1, wherein a first classifier included in the plurality of classifiers determines whether data has a first classification value, and wherein a second classifier included in the plurality of classifiers determines whether data has a second classification value, wherein the first classification value and the second classification value are different from each other.

9. The method of claim 1, wherein the obtaining the target data includes:

obtaining original data; and generating the target data by processing the original data.

10. The method of claim 1, wherein the neural network model includes one or more among one or more convolution layers, one or more pooling layers and one or more dense layers.

11. A computer-readable non-transitory recording medium having a program for executing a method on a computer, the method comprising:

obtaining target data;

obtaining first classification information by using a classifier set including a plurality of classifiers based on the target data;

obtaining second classification information by using a neural network model based on the target data;

comparing the first classification information and the second classification information; and verifying the classifier set based on a result of comparing the first classification information and the second classification information, wherein at least one of the first classification information and the second classification information includes a plurality of candidate classification values, wherein, if the second classification information includes the plurality of candidate classification values, the comparing the first classification information and the second classification information includes:

determining one or more candidate classification values that satisfy a configured criterion among the plurality of candidate classification values included in the second classification information; and identifying whether each of the one or more candidate classification values matches a classification value indicated by the first classification information, wherein the configured criterion is a criterion related to probabilities that data belongs to each of the plurality of candidate classification values, and determining by the computer, scheduling of an operation performed by a core, among a plurality of cores of a processor, to be assigned to the operation for each of the plurality of classifiers based on each classifier requirements for an amount of computation needed for the operation and computing power of each of the plurality of cores.

12. A method for classifying data in an electronic apparatus, comprising:

obtaining target data;

obtaining first classification information by using a classifier set including a plurality of classifiers based on the target data;

if the first classification information satisfies a configured condition, determining a classification value of the target data based on the first classification information; and if the first classification information does not satisfy the configured condition, obtaining second classification information by using a neural network model based on the target data;

comparing the first classification information and the second classification information; and determining a classification value of the target data based on the second classification information, wherein at least one of the first classification information and the second classification information includes a plurality of candidate classification values, wherein, if the second classification information includes the plurality of candidate classification values, the comparing the first classification information and the second classification information includes:

determining one or more candidate classification values that satisfy a configured criterion among the plurality of candidate classification values included in the second classification information; and identifying whether each of the one or more candidate classification values matches a classification value indicated by the first classification information, wherein the configured criterion is a criterion related to probabilities that data belongs to each of the plurality of candidate classification values, and determining by the electronic apparatus, scheduling of an operation performed by a core, among a plurality of cores of a processor, to be assigned to the operation for each of the plurality of classifiers based on each classifier requirements for an amount of computation needed for the operation and computing power of each of the plurality of cores.

13. An electronic apparatus for classifying data, comprising:

a memory for storing instructions; and a processor, wherein the processor, being connected to the memory, is configured to:

obtain target data;

obtain first classification information by using a classifier set including a plurality of classifiers based on the target data;

obtain second classification information by using a neural network model based on the target data;

compare the first classification information and the second classification information; and verify the classifier set based on a result of comparing the first classification wherein at least one of the first classification information and the second classification information includes a plurality of candidate classification values, wherein, if the second classification information includes the plurality of candidate classification values, the comparing the first classification information and the second classification information includes:

determining one or more candidate classification values that satisfy a configured criterion among the plurality of candidate classification values included in the second classification information; and identifying whether each of the one or more candidate classification values matches a classification value indicated by the first classification information, wherein the configured criterion is a criterion related to probabilities that data belongs to each of the plurality of candidate classification values, and determine by the electronic apparatus, scheduling of an operation performed by a core, among a plurality of cores of the processor, to be assigned to the operation for each of the plurality of classifiers based on each classifier requirements for an amount of computation needed for the operation and computing power of each of the plurality of cores.

14. The electronic apparatus of claim 13, further comprising, based on the result of comparing the first classification information and the second classification information, determining an operating method of the classifier set, wherein the operating method of the classifier set includes an operation sequence of the plurality of classifiers.

15. The electronic apparatus of claim 14, wherein the electronic apparatus determines the operating method of the classifier set further based on information of time required for the classifier set to generate the first classification information.

16. The electronic apparatus of claim 14, wherein the determining the operating method of the classifier set, includes:

based on the result of comparing the first classification information and the second classification information, determining reliability of the first classification information;

determining whether the reliability exceeds a configured threshold value; and if the reliability is less than the configured threshold value, changing the operating method of the classifier set.

17. The electronic apparatus of claim 13, wherein the obtaining the first classification information includes:

using a first classifier included in the plurality of classifiers based on the target data;

if output information of the first classifier satisfies a configured condition, determining the output information of the first classifier as the first classification information; and if the output information of the first classifier does not satisfy the configured condition, if a second classifier configured to operate in an order following the first classifier is present among the plurality of classifiers, using the second classifier based on the target data; and if the second classifier is not present, obtaining information indicating that the configured condition is not satisfied.

18. The electronic apparatus of claim 13, wherein the first classification information and the second classification information include at least one of information on whether the target data is abnormal data, and if the target data is abnormal, information on a reason for an abnormality.

19. The electronic apparatus of claim 13, further comprising accessing a processor for neural processing, wherein the processor for neural processing processes at least some of an operation for obtaining the first classification information, an operation for obtaining the second classification information and an operation for comparing the first classification information and the second classification information.

20. The electronic apparatus of claim 13, wherein a first classifier included in the plurality of classifiers determines whether data has a first classification value, wherein a second classifier included in the plurality of classifiers determines whether data has a second classification value, and wherein the first classification value and the second classification value are different from each other.

* * * * *